(12) United States Patent
Schlecht et al.

(10) Patent No.: US 6,520,239 B2
(45) Date of Patent: Feb. 18, 2003

(54) WINDUP WINDOW SHADE WITH A AMPLIFIED DRIVE MECHANISM

(75) Inventors: Werner P. Schlecht, Vaihingen/Enz (DE); Herbert Walter, Ebersbach (DE)

(73) Assignee: Bos GmbH & Co. KG, Ostfildern (DE)

( * ) Notice: Subject to any disclaimer, the term of this patent is extended or adjusted under 35 U.S.C. 154(b) by 0 days.

(21) Appl. No.: 09/989,401

(22) Filed: Nov. 21, 2001

(65) Prior Publication Data

US 2002/0059986 A1 May 23, 2002

(30) Foreign Application Priority Data

Nov. 22, 2000 (DE) .......................... 100 57 763

(51) Int. Cl.[7] ............................... E06B 9/40
(52) U.S. Cl. ................. 160/120; 160/370.22; 296/97.8; 296/265
(58) Field of Search ............................ 160/265, 370.22, 160/310, 23.1; 296/97.7, 97.8, 37.16

(56) References Cited

U.S. PATENT DOCUMENTS

| | | | |
|---|---|---|---|
| RE15,904 E | * | 8/1924 | Hein |
| 2,561,188 A | * | 7/1951 | Ferguson |
| 3,183,033 A | | 5/1965 | Stulbach |
| 3,410,601 A | * | 11/1968 | Thompson |
| 4,442,881 A | | 4/1984 | Monteath et al. |
| 4,758,041 A | | 7/1988 | Labeur |
| 5,201,810 A | * | 4/1993 | Ojima et al. |
| 5,653,278 A | * | 8/1997 | Cheng |
| 6,086,133 A | | 7/2000 | Alonso |
| 6,161,893 A | * | 12/2000 | Ewing et al. |

FOREIGN PATENT DOCUMENTS

DE 196 19 474 11/1997

* cited by examiner

Primary Examiner—Blair M. Johnson
(74) Attorney, Agent, or Firm—Norman N. Kunitz; Venable

(57) ABSTRACT

A windup window shade is provided with windup window shade means which, in the extracted state, make possible different degrees of opacity at the window. To this end, two window shade web are wound on separate windup shafts. Two window shade webs are wound onto separate windup shafts for this purpose. Only a single drive motor is required for the selective extension of one or the other window shade web.

18 Claims, 5 Drawing Sheets

WINDUP WINDOW SHADE WITH A AMPLIFIED DRIVE MECHANISM

BACKGROUND OF THE INVENTION

Modern automobile body shapes are distinguished by relatively large window areas. Because of strong sunlight, the large window areas result in considerable heat generation in the interior of the vehicle and, in connection with vehicles with air conditioning, this major heat generation results in a not inconsiderable use of energy in order to counteract the heating effects on the vehicle.

For this reason, motor vehicles are increasingly equipped with windup window shades.

In connection with this it is known to attach two guide rails laterally next to the window, in which the end of the traction rod of the window shade web is guided. The length of the traction rod is adjustable in order to be able to accommodate various window widths. Actuation takes place by means of the thrust members running in the guide rails.

Only two states are possible here, too, namely the unhampered entry of light or a reduction in accordance with the reduction effects of the windup shade web.

Based on the foregoing it is the object of the invention to create a windup window shade for motor vehicles, which allows a total of three operational states and has a simple drive mechanism.

SUMMARY OF THE INVENTION

In accordance with the invention, this object generally is achieved by a windup window shade for regulating the entry of light through a window into the interior of a motor vehicle, in particular a rear window windup shade, comprising: a first windup shaft, that is rotatably seated; a second windup shaft that is seated axially parallel and adjoining the first windup shaft, a first window shade web, one edge of which is fastened on the first windup shaft, and whose other edge, which is parallel with the on edge latter, is connected with a first traction rod; a second window shade web, one edge of which is fastened on the second windup shaft, and whose other edge, which is parallel with the one edge, is connected with a second traction rod; and a pair of guide means, each of which extends laterally next to the extended window shade webs. Additionally, the windup window shade includes a drive mechanism that only has a first and a second thrust member, and that is arranged such that one end of the first thrust member, selectively engages, i.e. acts together with, the one end of the first traction rod, and the other end of the first thrust member acts together with, i.e., selectively engages, the one end of the second traction rod, and such that one end of the second thrust member selectively engages the other end of the first traction rod, and the other end of the second thrust member selectively engages the other end of the second traction rod, and wherein in one position of the two thrust members none of the two window shade webs is extended.

The windup window shade in accordance with the invention has two window shade webs which, however, can be extended selectively, but not at the same time. Because of this, a total of three states is possible, in which the light entering through the respective window is differently affected.

Although there are two separate window shade webs, only a single drive motor is needed for them in the end. Use is made of the fact that the thrust members move in opposite directions for actuating the traction rods. By means of an appropriate cross coupling it is possible to extend one or the other window shade web with the aid of the same pair of thrust members.

Here, the reduction in the number of drive motors has a considerable economical importance. The reduction of the number to only a single motor leads to considerable cost reductions, because the gear motor represents an important cost factor in connection with such a windup window shade. Moreover, the space requirements are considerably reduced. The arrangement can be installed in spaces which sometimes might not offer sufficient space for two motors.

If the thrust members drive the traction rods by crosscoupling in such a way, that the ends of the same thrust member respectively actuate the ends of the two traction rods which are farther distanced from each other, tight radii of curvature and unnecessary lengths are avoided.

The actuation of the windup shafts and synchronization with the electrical drive mechanism of the traction rods becomes particularly simple when each of the windup shafts has its own spring drive, by means of which it is biased in the direction of the windup of the respective window shade web. The varied settings for the entry of light can be achieved if one of the window shade webs only slightly reduces the entry of light, so that a view through the extended window shade web is still possible. Such a window shade web preferably consists of a wide-mesh woven material, or of a perforated and dark-colored foil.

In contrast to this, the other window shade web can prevent the entry of light to a much larger degree if, for example, it is only used in a parked vehicle. In this case it is advantageous to design the window shade web in such a way that it prevents heating up of the vehicle interior to the best possible extent. Window shade webs coated with a reflecting material are particularly useful for this.

Moreover, the window shade web which is completely opaque offers a visual protection for the parked vehicle.

Windows are often not rectangular because of the shape of the vehicle body and other reasons of design.

As a rule, they have a more or less extensive trapezoidal shape. So that the traction rods can follow this shape, their shape can preferably be adjusted in length.

Assembly of the windup window shades in accordance with the invention is simplified, if the guide grooves which more closely adjoin each other are embodied in a common guide rail.

So that the length adjustment of the traction rods can also be performed without the aid of springs, the guide grooves are preferably undercut guide grooves in order to be able to generate with the aid of the guide grooves a force, by means of which the traction rod is longitudinally pulled.

The thrust members are flexible linearly shaped thrust members which are preferably mainly dynamically balanced. The tendency to rotate in curved sections, in which the thrust members are guided fixed against kinking, is counteracted by means of this.

The thrust members are comparatively easy to bend and because of this they are guided, safe from kinking, between the guide groove and the gear motor.

The thrust members preferably consist of an essentially cylindrical core, on the exterior of which teeth are formed. These teeth can be constituted by one or several helically extending ribs. In this way it is possible for the thrust members to act together interlockingly with the gear motor.

Since there is the danger, in particular with the dual drive mechanism in accordance with the invention, that the respective traction rod is not moved exactly parallel in relation to the respective windup shaft by the thrust members, it is practical to seat the windup shafts floatingly. In this way they can adjust themselves parallel with the traction rod by means of the action of their being biased in the respective window shade web. The appearance of folds, which otherwise would occur, is dependably prevented.

Further embodiments of the invention are inter alia subject of dependent claims. It is intended here that also those combinations of characteristics are considered to be claimed, for which there is no explicit exemplary embodiments.

BRIEF DESCRIPTION OF THE DRAWINGS

Exemplary embodiments of the subject of the invention are represented in the drawings. Shown are in.

DESCRIPTION OF THE PREFERRED EMBODIMENT

Figure 1:
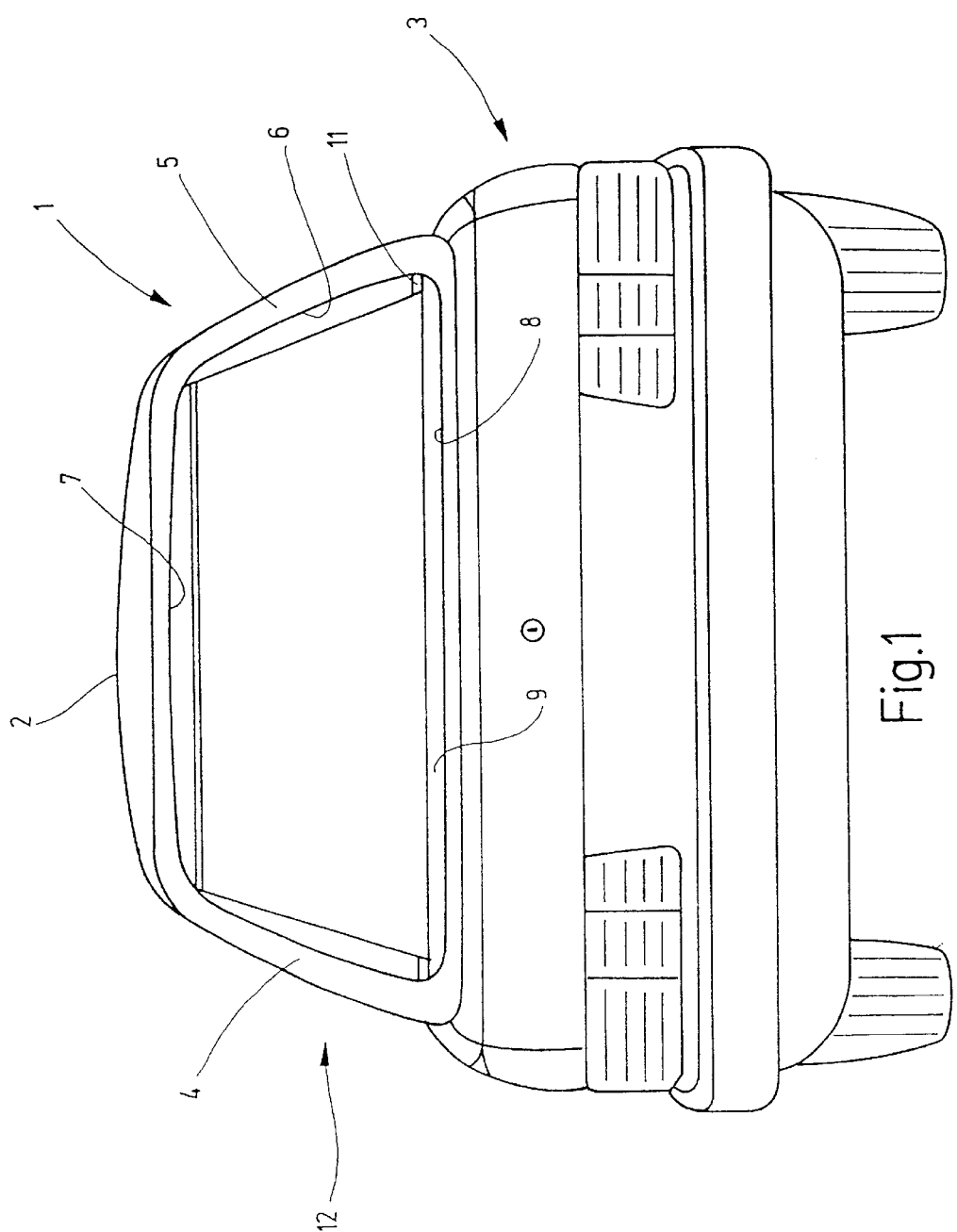
FIG. 1, a passenger car in a rear view, showing a rear window windup shade in accordance with the invention in the extended state, FIG. 2, the basic structure of the rear window windup shade in accordance with FIG. 1, FIG. 3, the guide rail of the rear window windup shade in accordance with FIG. 1 in a cross-sectional view, FIG. 4, the seating of the windup shafts of the rear window windup shade in accordance with FIG. 1 in a simplified schematic representation, FIG. 5, the drive mechanism of the rear window windup shade in accordance with FIG. 1 in a simple schematic representation, and FIG. 6, a shunt for bringing together the guide grooves of the windup window shade in a greatly schematized perspective representation.

In a schematic representation, FIG. 1 shows a rear view of a passenger car 1, having a roof 2, a trunk 3, as well as two C-pillars 4 and 5. A rear window opening 6, which is bordered at the top by a rear edge 7 of the roof and on the bottom by a lower window edge 8, is located between the two C-pillars 4 and 5. A rear window pane is seated in the rear window opening 6 in a known manner, for example glued in by means of a window rubber strip.

A rear window shelf 9 is located in the interior of the passenger car 1 in front of the rear window, which extends between the lower window edge 8 and the backrest of a rear seat, not visible in the drawing. A straight outlet slit 11 extends in the rear window shelf 9.

Figures 2, 3:
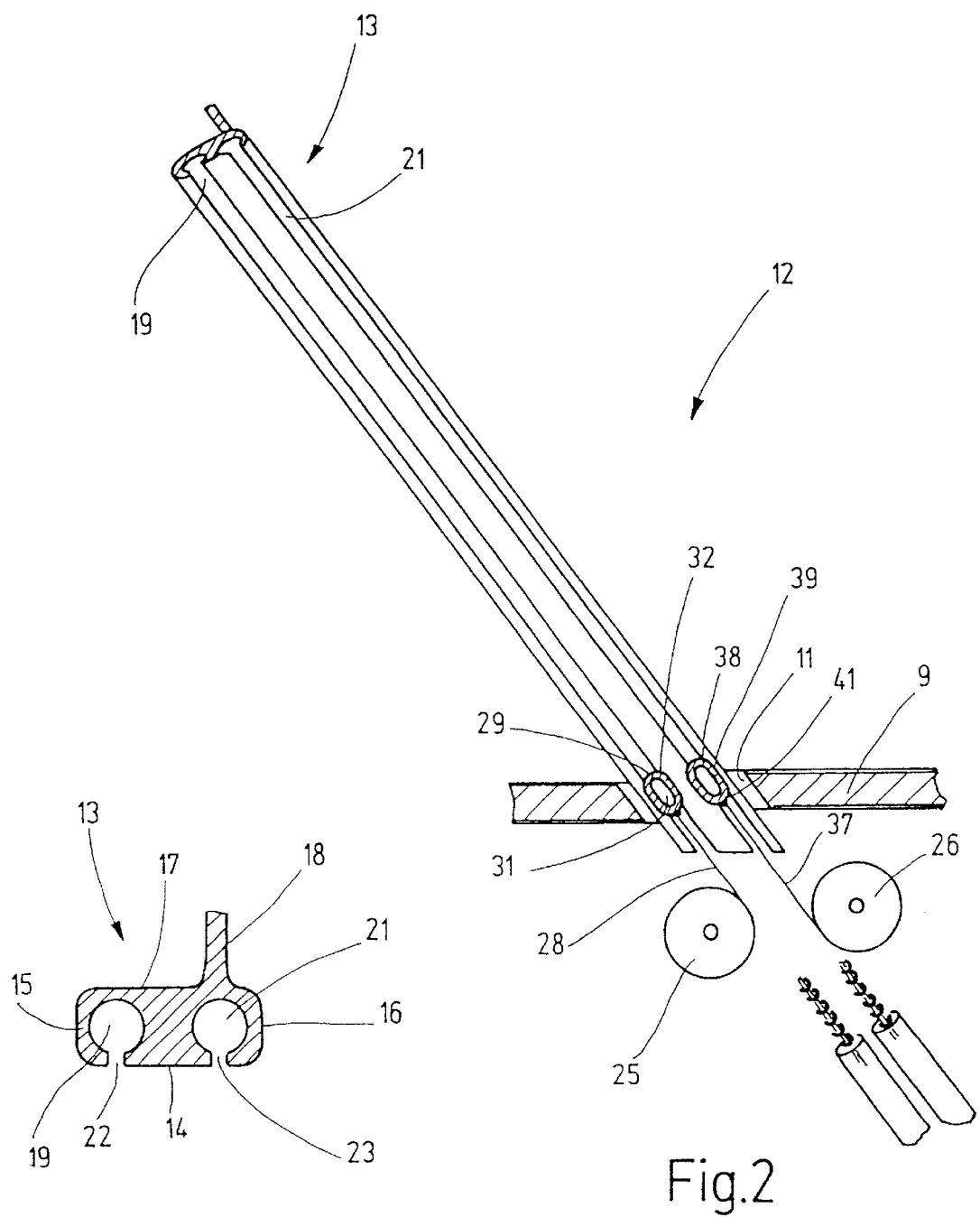

The outlet slit 11 is a part of a rear window windup shade 12, whose basic structure is shown, greatly schematized, in a lateral view in FIG. 2.

The rear window windup shade 12 has two guide rails, which are fastened next to the lateral edges of the rear window opening 6 on both C-pillars 4 and 5. Because of the cut-open basic representation, only one guide rail 13, which for example is fastened on the C-pillar 5, can be seen in FIG. 2.

The guide rail 13 has the cross-sectional profile represented in FIG. 3. It is essentially square in cross section and is bordered by a front 14, two lateral walls 15 and 16, as well as by a back 17. A strip-like fastening flange 18 extends from the back 17, with the aid of which the guide rail 13 is to be attached to appropriate parts of the vehicle body.

Two guide grooves 19 and 21, which are located parallel next to each other, are circular in cross section and open via slits 22 and 23 toward the front 14, are contained in the guide rail 13. The two guide grooves 19 and 21 are identical in cross section and extend along the guide rail 13 parallel and at equal distances.

The guide rail 13 is for example made of an extruded aluminum profile.

Since the slits 22, or 23 are narrower than the diameter of the circular section of the guide grooves 19, or 21, undercut grooves are created, which are suitable for protecting a linearly shaped thrust member against buckling and, by means of an appropriate cross section, to prevent the thrust member of an appropriate diameter from passing through the slit 22, or 23 to the outside.

The guide rails 13 are bent in respect to several axes so that they follow the contour of the window edge without becoming visible in the window itself. The guide rails 13 are arranged in such a way that the grooves 19 and 21 are located one behind the other in relation to the longitudinal extension of the vehicle, i.e. in relation to a vertical section through the vehicle, which follows the vehicle longitudinal axis, they lie next to each other, so that the one guide groove is located toward the trunk 3, and the other guide groove more toward the vehicle interior.

As FIG. 2 shows, the guide rails 13 extend downward through the slit 11 as far as below the rear window shelf 9.

Figure 4:
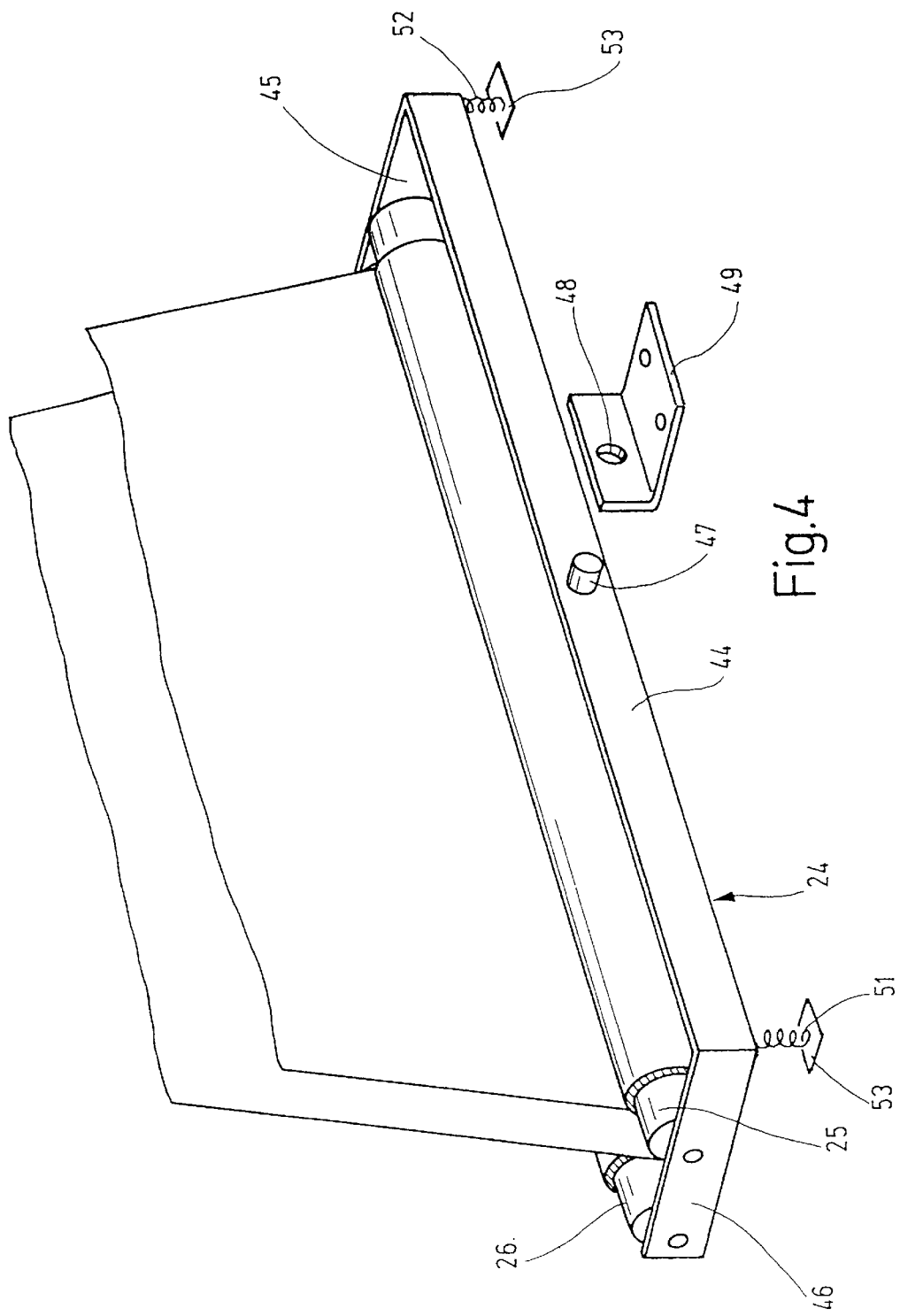

As indicated in FIG. 4, two windup shafts 25 and 26, which wind in opposite directions, are rotatably seated in a seating hoop 24. Each one of the windup shafts 25 and 26 is tube-shaped and houses a spring drive. This spring drive for the windup shaft 26 is schematically represented at 27 in FIG. 5. The spring drive 27 consists of a helical spring, one end of which is fastened in the interior of the respective windup roller and the other end is anchored to a seating hoop 24.

Figure 5:
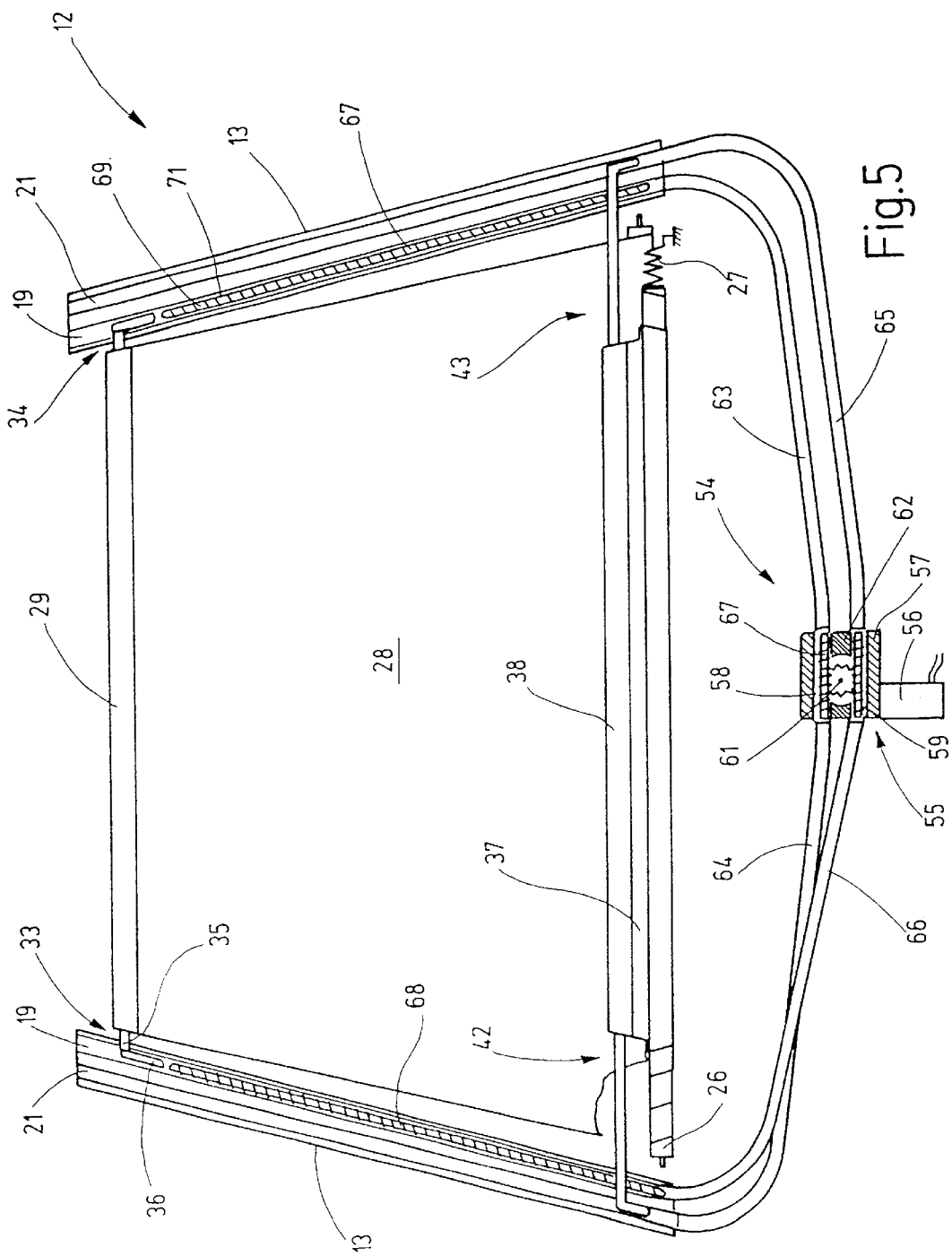

A window shade web 28 is fastened with one edge on the windup roller 25 located toward the interior of the vehicle, whose shape is a trapezoidal approximation of the contour of the rear window 6. The edge remote from the windup roller 25 is formed into a hose-shaped loop 29, in which a traction rod 31 is seated. The traction rod 31 consists of a dimensionally stable tube 32, into which two L-shaped guide members 33 and 34 have been inserted from both ends, as illustrated in FIG. 5.

The guide member 33 consists of a long leg 35, which can be displaced in the dimensionally stable tube 32, and of a leg 36 which is angled off in an L-shape. The leg 35 is matched to the cross section of the dimensionally stable tube 32 and its dimensions are such that it can reach through the slit 22, or 23, into the interior of the respective guide groove 19 or 21. But the leg 36 is matched to the cross section of the circular part of the guide grove 19 or 21. In this way the leg 35 can be longitudinally displaced in the dimensionally stable tube 32, and the leg 36 can move along the respective guide groove 19, 21. It cannot be pulled laterally out of the slit 22, 23.

The guide member 34 has the same structure as the guide member 33, so that another explanation can be omitted.

A further window shade web 37 is attached to one end of the windup shaft 26, which also forms a loop 38 at its edge remote from the windup shaft 26. A longitudinally adjustable traction rail 39 is seated in the loop 38. It consists of a dimensionally stable tube 41, whose length corresponds to the edge and in which two guide members 42 and 43 are guided, which have the same structure as that extensively explained in connection with the guide member 33.

The window shade webs 28 and 37 run off between the windup shafts 25, 26.

The seating hoop 24 for seating the two windup shafts 25 and 26 is a U-shaped structure, having a rear element 44 and two legs 45 and 46 extending at right angles therefrom, in which the windup shafts 25 and 26 are rotatably seated by means of appropriate bearing journals.

A bearing journal 47 is located in the center of the rear element 44, whose axis extends at right angles to the axes of the two windup shafts 25 and 26, which are axis-parallel with each other. The bearing journal 47 is seated in a bearing bore 48 of a holder 49, which is fixedly anchored in the vehicle underneath the rear window shelf 9. In this way the two windup shafts 25 and 26 can rotate, limited in respect to the axis defined by the bearing journal 47.

The middle position, i.e. the centered position, is defined by two compression springs 51 and 52, one end of which is supported on the seating hoop 24, and the other on a rest 53 which is fixed in place on the vehicle body and is schematically indicated. The two springs 51 and 52 are seated on the transition point of the rear element 44 in the respective legs 45 or 46, so that equal torques are generated.

A drive mechanism 54, which is represented in a greatly schematized manner in FIG. 5, is provided for extending the window shade webs 28 and 37. To simplify the representation and to make the understanding of the invention easier, the two lateral guide rails 13 are represented rotated in section in FIG. 5 in such a way that the two guide grooves 19 and 21 are located next to each other in the drawing plane. As stated, this illustration is merely provided for making understanding easier. In actuality the two guide grooves 19 and 21 are located behind each other and also open in the direction toward each other and not in the direction toward the viewer.

A gear motor 55 is a part of the drive mechanism 54, which is composed of a permanently excited d.c. motor 56 and a gear housing. Two guide channels 58 and 59 are contained parallel to each other in the gear housing, between which an output gear wheel 62 is provided on an output shaft 61. The output gear wheel 62 can be selectively put into motion in both directions of rotation by means of the output shaft 61, which is connected with it fixed against relative rotation.

A guide tube 63 runs from the guide channel 58 to the lower end of the guide groove 19 in the right guide rail 13. A further guide tube 64 connects the other end of the guide channel 58 with the lower end of the guide groove 21 in the left guide rail 13. At the right end, the guide channel 59 is connected via a guide tube 65 with the lower end of the guide groove 21 in the right guide rail 13, and at the left end via a guide tube 66 with the lower end of the guide groove 19 in the guide rail 13. A flectionally elastic, linearly-shaped thrust member 67, or 68, extends through the guide channel 58, as well as through the guide channel 59. The length of the two thrust members 67 and 68 is of such a dimensions that, in the neutral position, they just do not project into the associated guide grooves 19, or 21.

The two thrust members 67 and 58 are identically constructed. Each consists of an elastically flexible core 69, which has one or several ribs 71 on its exterior, which form a single-or multi-start screw thread there. The ribs 71 protrude radially and run helically over the cylindrical core 69 from one end of the thrust member to the other end. The output gear wheel 62 has teeth which can enter between the grooves formed by the ribs 71. In this way the output gear wheel 62 is interlockingly coupled with the thrust members 67 and 68.

The mode of functioning of the described rear window windup shade is as follows:

In the position of rest, the windup shafts 25, 26 have been rotated by the action of the respective spring drives 27 into a position in which the window shade webs are wound up.

In this position the hose-like loops 29 and 38 are located in the outlet slit 11, as can be seen in FIG. 2. The guide members 33, 34 and 42, 43 are located in the vicinity of the lower ends of the two guide rails 13, but without the legs 36 having been released out of the associated guide grooves 19 and 21. For the guide members 42 and 43 this position is shown in FIG. 5. The guide members 33 and 34 take up a similar position and, if they had been drawn in FIG. 5, would be concealed by the guide members 42 and 43.

At the same time the two ends of the thrust members 68 and 69 are spaced apart from the respective legs 36.

If, starting from this position of the rear windup window shade 12, in which the entry of light into the vehicle interior is not hampered at all, the user would like to create a first shading effect, he would extend the window shade web 28, for example. The window shade web 28 reduces the entry of light, but without stopping it completely. For this purpose the window shade web 28 is made, for example, of an open chain weave, or a perforated plastic foil, which is colored black.

To extend the window shade web 28, the gear motor 55 is put into operation in a direction of rotation in which it moves the thrust member 69 toward the right through the guide groove 19. Since the two thrust members 68 and 69 mesh with the output gear wheel 62 at diametrically opposite ends, the thrust member 68 is simultaneously pushed forward toward the left through the guide groove 19 and the left guide rail 13. After a short distance over the advance path, the free ends of the two thrust members 68 and 69 come into engagement with the lower ends of the legs 36 of the two guide members 33 and 34, and in the further process push the guide members 33 and 34 in the direction toward the upper end of the two guide rails 13.

Since the distance between the guide rails changes, the legs 35 of the guide members 33 and 34 simultaneously dip into the dimensionally stable tube 33 of the traction rail 31 contained in the respective loop 29.

As soon as the end position has been reached, the gear motor 55 is stopped. The gear motor 55 is self-locking and arrests the thrust members 68 and 69 in their respectively reached positions.

The switch-off of the gear motor 55 is performed with the aid of limit stop switches, or in that the guide members 33 and 34 run up against stops, so that a blocking current occurs, which is evaluated in an electronic device and leads to switch-off.

The window shade web 28 is now held stretched between the traction rail 31 and the respective windup shaft 25.

For retraction, the gear motor 55 is started in the opposite direction of rotation, so that the two thrust members 68 and 69 are moved downward out of tree associated guide rails 13. The traction rail 31 simultaneously moves downward, because the window shade web 28 is constantly kept under tension by the action of the spring drive 27 of the windup shaft 25.

As soon as the window shade web 28 is completely wound, the ends of the thrust members 68 and 69 are freed from the guide members 33 and 34. This centered middle position can also be detected by limit stop switches and results in the stop of the gear motor 55.

If, following the complete retraction of the window shade web 28, the gear motor 55 remains switched on in the same direction of rotation, the thrust member 69 is pushed forward in the guide grove 21 of the left guide rail 13, and the thrust member 68 in the guide groove 21 of the right guide rail 13. Since the traction rod 39 of the other window shade web 37 is conducted in the guide grooves 21, this traction rod 39 is now taken along by the two thrust members 68 and 69. The result of this is that now the window shade web 37 is stretched in front of the rear window 6.

The window shade web 37 has a different transparency to light than the window shade web 28. For example, the window shade web 37 can be completely opaque, so that any entry of light into the vehicle interior is prevented. Such an operating position is particularly advantageous when the car is parked, because it is possible by means of this to prevent the heating of the interior by the radiation of light through the rear window.

The entry of heat by radiation can be further reduced if the outward facing side of the window shade web 37 is additionally metallized for reflecting infrared radiation.

Retraction of the window shade web 37 takes place in the respectively opposite manner.

Since because of assembly tolerances it is not always assured that the thrust members 68 and 69 lift the respective traction rods 31 or 39 exactly parallel in respect to the associated windup shaft 25 or 26, tilting of the respective traction rail 31 or 39 in respect to the associated windup shaft 25, 26 can occur. Without corrective action, the tilting would lead to obliquely extending waves or folds in the respective window shade web. However, since the two windup rollers 25 and 26 are pivotably received in the seating loop 24, the windup shaft can align itself in a limited manner obliquely, and therefore exactly parallel with the respective traction rod 31, 39. Obliquely extending tension in the window shade web is prevented.

The loop is biased into the centered position with the aid of the two springs 51 and 52. Tumbling around the transverse axis, and therefore clattering during the drive is prevented.

Figure 6:
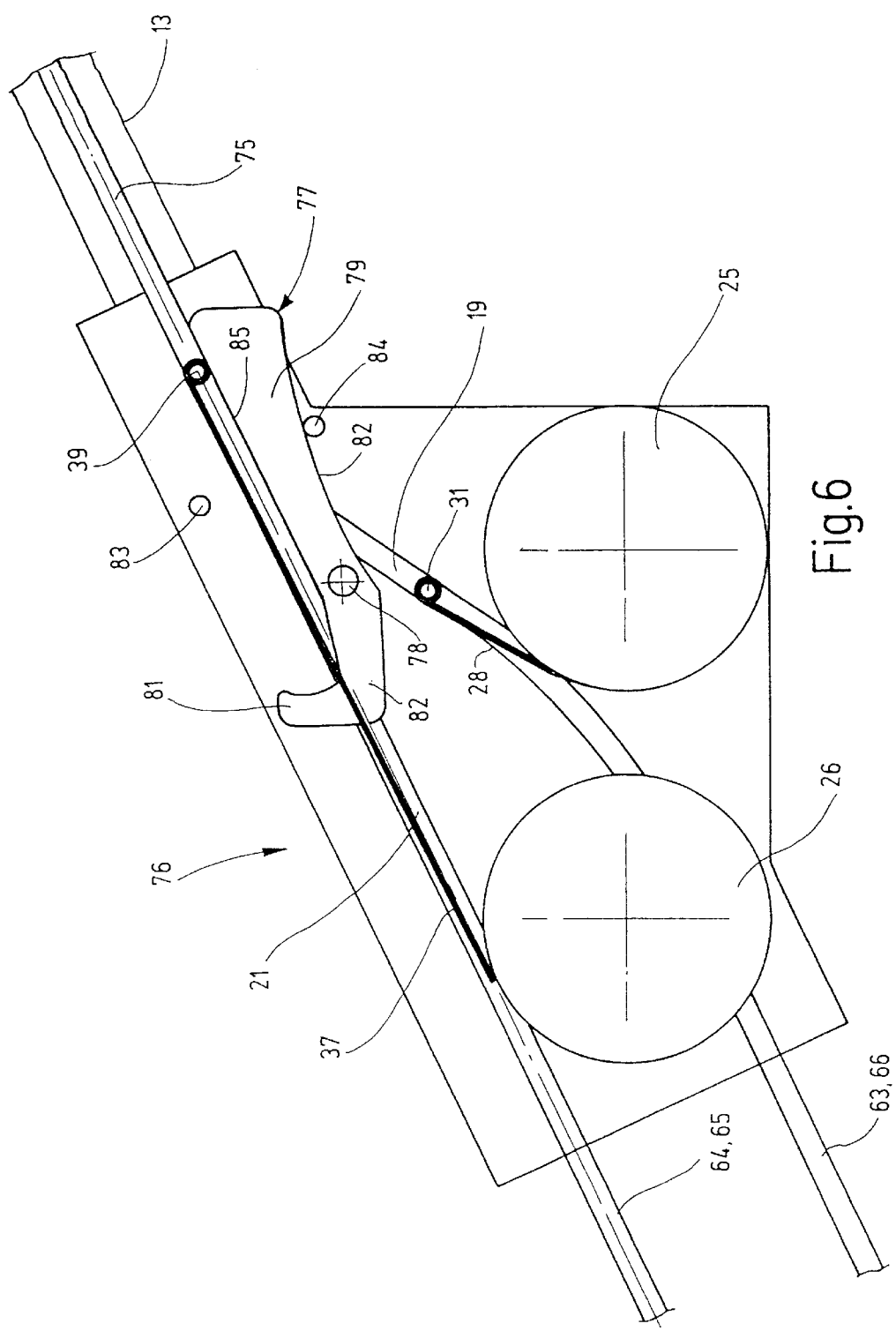

FIG. 6 shows an alternative embodiment of the guide means for guiding the traction rods 31 and 39.

While in the exemplary embodiment in accordance with FIGS. 2 and 5 two guide grooves are contained in each guide rail, the exemplary embodiment in accordance with FIG. 6 only has one guide groove 75 per side of the windup window shade 12. At its end toward the windup shaft, the guide rail 13 makes a transition into a shunt 76, in which the guide groove 75 is split into two guide grooves 19 and 21. As in the exemplary embodiment of FIG. 5, the guide tubes 63 to 66 terminate in the analogously identical manner in the extension of the two guide grooves 19 and 21.

In the exemplary embodiment represented, the guide groove 21 extends essentially in a straight line and terminates without a curve in the guide groove 75, while the guide groove 19 represents the fork out of the guide groove 75 and terminates coming from the side.

In order to let the traction rods 31 and 39 enter into the respectively correct guide groove 19, or 21, a pivotably seated shunt tongue 77 is provided. The shunt tongue 77 is seated at 78 and is pivotable around a shaft which lies parallel with the axes of the two windup shafts 25 and 26. The shaft 78 is located on the crossing tongue of the shunt 76 directly before the two grooves 19 and 21 meet.

The shunt tongue 77 represents a two-armed lever with a first section 79 and a second section 82, which contains a hook 81.

The shunt operates as follows:

In the position of rest, when both window shade webs 28 and 37 are retracted, the traction rod 39 lies in the hook 81 and pivots the shunt tongue 77 in a counterclockwise direction in accordance with FIG. 6. The pivot is sufficient for letting the section 79 complement the curved path at the transition from the groove 19 to the groove 75 with its guide face 82. In this position the section 79 rests against a stop 83.

The traction rod 31 can now be pushed away from the windup shaft 25 via the respective thrust member 68 or 69, which is guided by means of the guide tube 63, or 66. In the course of this the guide rod 31 moves after a short distance out of the guide groove 19 into the common guide groove 75.

During retraction, the traction rod 31 runs along the guide face 82 and by means of this is returned into the groove 19 in the further course of this.

When the window shade web 37 is extended, the traction rod 38 moves out of the hook 81, so that the shunt tongue 77 rests with its guide face 82 against a stop 84 because of the action of a spring, not further represented. In this position a guide face 85, which is essentially located opposite the guide face 79, closes the inlet into the guide groove 19.

FIG. 6 represents the state directly after the traction rod 39 has entered the guide groove 75, or the state directly prior to the traction rod 39 passing the guide groove 19 when entering the mouth of the guide groove 19.

Now the window shade web 37 can be extended and also retracted again as previously described. The shunt tongue 77 sees to it that the traction rod 39 comes to rest in the correct guide groove 21 after passing the branch point.

A windup window shade is provided with windup window shade means which, in the extracted state, make possible different degrees of opacity at the window. To this end, two window shade web are wound on separate windup shafts. Two window shade webs are wound onto separate windup shafts for this purpose. Only a single drive motor is required for the selective extension of one or the other window shade web.

What is claimed is:

1. A windup window shade (12) for regulating the entry of light through a window into the interior of a motor vehicle, in particular a rear window windup shade, comprising:

a first windup shaft (25), which is rotatably seated, a second windup shaft (26), which is seated axially parallel and adjoining the first windup shaft (25), a first window shade web (28), one edge of which is fastened on the first windup shaft (25), and whose edge (29), which is parallel with the latter, is connected with a first traction rod (31), a second window shade web (37), one edge of which is fastened on the second windup shaft (26), and whose edge (38), which is parallel with the latter, is connected with a second traction rod (39), a pair of guide means (13, 76), each of which extends laterally next to the extended window shade webs (28, 37), and a drive mechanism (54), which only has a first and a second thrust member (68, 69), which is arranged such that one end of the first thrust member (68) selectively engages the one end of the first traction rod (31), and the other end of the first thrust member (68) selectively engages the one end of the second traction rod (39), and such that one end of the second thrust member (69) selectively engages the other end of the first traction rod (31), and the other end of the second thrust member (69) selectively engages with the other end of the second traction rod (39), and wherein in one position of the two thrust members (68, 69) none of the two window shade webs (28, 37) is extended.

2. The window windup shade in accordance with claim 1, wherein the one end of the first traction rod (31) and the one end of the second traction rod (39) run in guide grooves (19, 21, 75), which are distanced from each other by essentially the length of the first or the second windup roller (25, 26).

3. The window windup shade in accordance with claim 1, wherein the guide means (13, 76) form a pair of first guide grooves (19), which extend along the side of the extended first window shade web (28) and are used for guiding the first traction rod (31), and a pair of second guide grooves (21), which extend along the side of the extended second window shade web (37) and are used for guiding the second traction rod (39).

4. The window windup shade in accordance with claim 1, wherein the guide means (13, 76) form a pair of first guide grooves (19), which extend at a distance along the side of the extended first window shade web (28) and are used for guiding the first traction rod (31), and a pair of second guide grooves (21), which extend at a distance along the side of the extended second window shade web (37) and are used for guiding the second traction rod (39), and that the first guide grooves (19) and the second guide grooves (21) terminate in a shunt (76), from which only one guide groove (75) is continued, which extends along the respective window edge.

5. The window windup shade in accordance with claim 1, wherein at least one of the first and the second windup shaft (25, 26) is respectively assigned its own spring drive (27), which spring-biases the respective windup shaft (25,26) in the direction of winding up.

6. The window windup shade in accordance with claim 1, wherein the one window shade web (28, 37) consists of at least one of a woven material and a perforated foil.

7. The window windup shade in accordance with claim 1, wherein one of the window shade webs (28, 37) is essentially completely opaque.

8. The window windup shade in accordance with claim 1, wherein one of the window shade webs (28, 37) is metallized on the side facing away from the interior of the vehicle.

9. The window windup shade in accordance with claim 1, wherein at least one of the first and the second traction rod (31, 39) is adjustable in length such that it can follow in the changing distance of the guide grooves (19, 21, 75).

10. The window windup shade in accordance with claim 3, wherein the adjoining guide grooves (19, 21) of the two pairs of guide grooves (19, 21) are arranged in a common guide rail (13).

11. The window windup shade in accordance with claim 2, wherein the guide grooves (19, 21, 75) are undercut guide grooves.

12. The window windup shade in accordance with claim 1, wherein the drive mechanism (54) for moving the two thrust members (68, 69) comprises only a single gear motor (55).

13. The window windup shade in accordance with claim 1, wherein the thrust members (68, 69) are flexible linearly-shaped thrust members, which are guided secure against kinking between the gear motor (55) and the respective guide groove (19, 21).

14. The window windup shade in accordance with claim 9, wherein the thrust members (68, 69) are approximately cylindrical structures, which are provided with teeth (71) on the exterior, which run over the length at a constant pitch.

15. The window windup shade in accordance with claim 1, wherein the teeth (71) are formed by a rib, which extends helically on the exterior.

16. The window windup shade in accordance with claim 1, wherein the thrust members (68, 69) act interlockingly together with the gear motor (55).

17. The window windup shade in accordance with claim 1, wherein at least one of the windup rollers (25, 26) is seated with its end in a seating hoop (24), which is seated, pivotable in respect to an axis of the vehicle, on a base (49) fixed to the vehicle, wherein the axis extends at right angles to the respective windup shaft (25, 26).

18. The window windup shade in accordance with claim 1, wherein the seating hoop (24) is elastically biased in a centered position by means of spring means (51, 52).

* * * * *